United States Patent
Ranganath

(10) Patent No.: US 8,943,428 B2
(45) Date of Patent: Jan. 27, 2015

(54) SYSTEM FOR AND METHOD OF FIELD MAPPING

(75) Inventor: Panduranga Ranganath, Union City, CA (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 602 days.

(21) Appl. No.: 12/917,342

(22) Filed: Nov. 1, 2010

(65) Prior Publication Data

US 2012/0110485 A1    May 3, 2012

(51) Int. Cl.
*G06F 3/0486*    (2013.01)
*G06F 17/30*    (2006.01)

(52) U.S. Cl.
CPC .................. *G06F 17/303* (2013.01)
USPC ....................................... 715/769

(58) Field of Classification Search
CPC ........... G06F 3/0486; G06F 17/30578; H04L 29/0854
USPC ....................................... 715/769
See application file for complete search history.

(56) References Cited

U.S. PATENT DOCUMENTS

| | | | |
|---|---|---|---|
| 4,887,212 A | 12/1989 | Zamora et al. | 364/419 |
| 4,939,689 A * | 7/1990 | Davis et al. | 1/1 |
| 5,111,398 A | 5/1992 | Nunberg et al. | 364/419 |
| 5,115,466 A | 5/1992 | Presttun | 380/9 |
| 5,130,993 A | 7/1992 | Gutman et al. | 371/42 |
| 5,146,221 A | 9/1992 | Whiting et al. | 341/67 |
| 5,204,902 A | 4/1993 | Reeds et al. | |
| 5,329,619 A | 7/1994 | Page et al. | 395/200 |
| 5,392,390 A | 2/1995 | Crozier | 395/161 |
| 5,418,854 A | 5/1995 | Kaufman et al. | 713/156 |
| 5,418,908 A | 5/1995 | Keller et al. | 395/200 |
| 5,425,079 A | 6/1995 | Noda et al. | 379/68 |
| 5,483,352 A | 1/1996 | Fukuyama | 358/402 |
| 5,485,161 A | 1/1996 | Vaughn | 342/357.13 |
| 5,509,070 A | 4/1996 | Schull | |
| 5,519,433 A | 5/1996 | Lappington et al. | 725/110 |
| 5,519,606 A | 5/1996 | Frid-Nielsen et al. | 364/401 |
| 5,543,789 A | 8/1996 | Behr et al. | 340/995 |

(Continued)

FOREIGN PATENT DOCUMENTS

| | | | |
|---|---|---|---|
| CN | 1202662 | 12/1998 | G06F 17/30 |
| CN | 1455522 | 11/2003 | H04Q 7/38 |

(Continued)

OTHER PUBLICATIONS

Scanniello, Giuseppe et al., "An Approach and an Eclipse Based Environment for Data Migration," University of Basilicata, IEEE 2008, pp. 237-246.

(Continued)

*Primary Examiner* — Phenuel Salomon
(74) *Attorney, Agent, or Firm* — Haverstock & Owens LLP

(57) ABSTRACT

A system for and method of field mapping utilizing a user interface allows efficient and accurate mapping of fields on two or more devices. Fields that match between a first device and a second device are automatically mapped. For the fields that do not match, the user interface provides a list of available fields on the second device, so that the user can select where to map the field from the list of available fields. In some embodiments, an intermediate device such as a server contains the fields and data to be mapped and transferred to the second device.

14 Claims, 5 Drawing Sheets

(56) References Cited

U.S. PATENT DOCUMENTS

| | | | | |
|---|---|---|---|---|
| 5,544,061 A | 8/1996 | Morimoto et al. | | 340/995 |
| 5,561,446 A | 10/1996 | Montlick | | 345/173 |
| 5,574,906 A | 11/1996 | Morris | | 395/601 |
| 5,579,489 A | 11/1996 | Dornier et al. | | 395/281 |
| 5,588,009 A | 12/1996 | Will | | 371/33 |
| 5,592,470 A | 1/1997 | Rudrapatna et al. | | 370/320 |
| 5,623,406 A | 4/1997 | Ichbiah | | 364/999.999 |
| 5,623,661 A | 4/1997 | Hon | | 395/601 |
| 5,628,005 A | 5/1997 | Hurvig | | 395/608 |
| 5,630,081 A | 5/1997 | Rybicki et al. | | 395/348 |
| 5,638,508 A | 6/1997 | Kanai et al. | | 714/20 |
| 5,640,577 A | 6/1997 | Scharmer | | 395/765 |
| 5,644,709 A | 7/1997 | Austin | | 395/185.06 |
| 5,647,002 A | 7/1997 | Brunson | | 380/49 |
| 5,649,195 A | 7/1997 | Scott et al. | | 395/617 |
| 5,650,800 A | 7/1997 | Benson | | 345/173 |
| 5,657,372 A | 8/1997 | Ahlberg | | |
| 5,666,397 A | 9/1997 | Lamons et al. | | 379/34 |
| 5,666,553 A | 9/1997 | Crozier | | 395/803 |
| 5,682,524 A | 10/1997 | Freund et al. | | 395/605 |
| 5,684,990 A | 11/1997 | Boothby | | 395/619 |
| 5,694,596 A | 12/1997 | Campbell | | 395/610 |
| 5,699,255 A | 12/1997 | Ellis et al. | | 701/212 |
| 5,701,423 A * | 12/1997 | Crozier | | 715/762 |
| 5,706,509 A | 1/1998 | Man-Hak Tso | | 395/617 |
| 5,710,922 A | 1/1998 | Alley et al. | | 395/617 |
| 5,727,202 A | 3/1998 | Kucala | | 395/610 |
| 5,727,950 A | 3/1998 | Cook et al. | | 434/350 |
| 5,729,735 A | 3/1998 | Meyering | | 395/610 |
| 5,729,739 A | 3/1998 | Cantin et al. | | 395/614 |
| 5,729,743 A | 3/1998 | Squibb | | 395/619 |
| 5,742,792 A | 4/1998 | Yanai et al. | | 395/489 |
| 5,745,750 A | 4/1998 | Porcaro | | 707/102 |
| 5,745,906 A | 4/1998 | Squibb | | 707/203 |
| 5,757,920 A | 5/1998 | Misra et al. | | 380/25 |
| 5,758,150 A | 5/1998 | Bell et al. | | 395/610 |
| 5,758,354 A | 5/1998 | Huang et al. | | |
| 5,758,355 A | 5/1998 | Buchanan | | 707/201 |
| 5,764,899 A | 6/1998 | Eggleston et al. | | 395/200.33 |
| 5,768,480 A | 6/1998 | Crawford, Jr. et al. | | 395/62 |
| 5,768,597 A | 6/1998 | Simm | | 395/712 |
| 5,771,354 A | 6/1998 | Crawford | | 395/200.59 |
| 5,778,346 A * | 7/1998 | Frid-Nielsen et al. | | 705/7.24 |
| 5,778,361 A | 7/1998 | Nanjo et al. | | 707/500 |
| 5,778,367 A | 7/1998 | Wesinger et al. | | 395/10 |
| 5,778,388 A | 7/1998 | Kawamura et al. | | 707/203 |
| 5,781,901 A | 7/1998 | Kuzma | | 707/10 |
| 5,787,247 A | 7/1998 | Norin et al. | | 395/200.5 |
| 5,787,262 A | 7/1998 | Shakib et al. | | 395/200.35 |
| 5,794,228 A | 8/1998 | French et al. | | 707/2 |
| 5,804,803 A | 9/1998 | Cragun et al. | | 235/375 |
| 5,809,497 A | 9/1998 | Freund et al. | | 707/2 |
| 5,812,773 A | 9/1998 | Norin | | 395/200.34 |
| 5,812,793 A | 9/1998 | Shakib et al. | | 395/200.31 |
| 5,818,437 A | 10/1998 | Grover et al. | | 345/811 |
| 5,826,245 A | 10/1998 | Sandberg-Diment | | 705/44 |
| 5,828,376 A | 10/1998 | Solimene et al. | | |
| 5,832,489 A | 11/1998 | Kucala | | 707/10 |
| 5,832,518 A | 11/1998 | Mastors | | 707/202 |
| 5,832,519 A | 11/1998 | Bowen et al. | | 707/203 |
| 5,832,520 A | 11/1998 | Miller | | |
| 5,845,283 A | 12/1998 | Williams et al. | | 707/101 |
| 5,859,973 A | 1/1999 | Carpenter | | 395/200.33 |
| 5,864,864 A | 1/1999 | Lerner | | 707/102 |
| 5,875,296 A | 2/1999 | Shi et al. | | 395/188.01 |
| 5,884,323 A | 3/1999 | Hawkins et al. | | 707/201 |
| 5,884,325 A | 3/1999 | Bauer et al. | | 707/201 |
| 5,893,119 A | 4/1999 | Squibb | | 707/203 |
| 5,896,321 A | 4/1999 | Miller | | 365/189.01 |
| 5,897,640 A | 4/1999 | Veghte et al. | | 707/202 |
| 5,897,642 A | 4/1999 | Capossela et al. | | 707/203 |
| 5,903,723 A | 5/1999 | Beck et al. | | 709/203 |
| 5,907,793 A | 5/1999 | Reams | | 455/3.1 |
| 5,909,568 A * | 6/1999 | Nason | | 703/23 |
| 5,923,756 A | 7/1999 | Shambroom | | 713/156 |
| 5,923,848 A | 7/1999 | Goodhand et al. | | 395/200.49 |
| 5,926,816 A | 7/1999 | Bauer et al. | | 707/8 |
| 5,933,653 A | 8/1999 | Ofek | | 395/826 |
| 5,933,778 A | 8/1999 | Buhrmann et al. | | 455/461 |
| 5,933,816 A | 8/1999 | Zeanah et al. | | 705/35 |
| 5,935,262 A | 8/1999 | Barrett et al. | | 714/46 |
| 5,937,405 A | 8/1999 | Campbell | | 707/10 |
| 5,941,944 A | 8/1999 | Messerly | | 709/203 |
| 5,943,676 A | 8/1999 | Boothby | | 707/201 |
| 5,944,787 A | 8/1999 | Zoken | | 709/206 |
| 5,946,615 A | 8/1999 | Holmes et al. | | 455/412 |
| 5,948,066 A | 9/1999 | Whalen et al. | | 709/229 |
| 5,950,193 A | 9/1999 | Kulkarni | | |
| 5,951,636 A | 9/1999 | Zerber | | 709/202 |
| 5,961,572 A | 10/1999 | Craport et al. | | 340/990 |
| 5,961,590 A | 10/1999 | Mendez et al. | | 709/206 |
| 5,966,717 A * | 10/1999 | Sass | | 1/1 |
| 5,968,131 A | 10/1999 | Mendez et al. | | 709/246 |
| 5,970,149 A | 10/1999 | Johnson | | 714/46 |
| 5,970,490 A | 10/1999 | Morgenstern | | 707/10 |
| 5,971,277 A | 10/1999 | Cragun et al. | | 235/462.01 |
| 5,974,238 A | 10/1999 | Chase, Jr. | | 395/200.78 |
| 5,974,563 A | 10/1999 | Beeler, Jr. | | 714/5 |
| 5,987,381 A | 11/1999 | Oshizawa | | 340/990 |
| 5,987,609 A | 11/1999 | Hasebe | | 726/35 |
| 5,995,118 A | 11/1999 | Masuda | | 345/467 |
| 6,000,000 A | 12/1999 | Hawkins et al. | | 707/201 |
| 6,006,215 A | 12/1999 | Retallick | | 707/2 |
| 6,006,274 A | 12/1999 | Hawkins et al. | | 709/248 |
| 6,009,462 A | 12/1999 | Birrell et al. | | 709/206 |
| 6,012,063 A | 1/2000 | Bodnar | | 707/101 |
| 6,012,088 A | 1/2000 | Li et al. | | 709/219 |
| 6,014,695 A | 1/2000 | Yamashita et al. | | 709/219 |
| 6,016,394 A | 1/2000 | Walker | | 717/104 |
| 6,016,478 A | 1/2000 | Zhang et al. | | 705/9 |
| 6,023,620 A | 2/2000 | Hansson | | |
| 6,023,708 A * | 2/2000 | Mendez et al. | | 1/1 |
| 6,023,723 A | 2/2000 | McCormick et al. | | 709/206 |
| 6,026,414 A | 2/2000 | Anglin | | 707/204 |
| 6,034,621 A * | 3/2000 | Kaufman | | 340/7.21 |
| 6,038,665 A | 3/2000 | Bolt et al. | | 713/176 |
| 6,044,381 A | 3/2000 | Boothby et al. | | 707/201 |
| 6,049,776 A | 4/2000 | Donnelly et al. | | 705/8 |
| 6,052,735 A | 4/2000 | Ulrich et al. | | 709/236 |
| 6,058,399 A | 5/2000 | Morag et al. | | 707/201 |
| 6,061,790 A | 5/2000 | Bodnar | | 713/171 |
| 6,061,796 A | 5/2000 | Chen et al. | | 713/201 |
| 6,063,134 A | 5/2000 | Peters et al. | | 717/11 |
| 6,064,880 A | 5/2000 | Alanara | | 455/419 |
| 6,065,018 A | 5/2000 | Beier et al. | | 707/202 |
| 6,067,582 A | 5/2000 | Smith et al. | | |
| 6,073,133 A | 6/2000 | Chrabaszcz | | 707/10 |
| 6,076,109 A | 6/2000 | Kikinis | | 709/228 |
| 6,078,960 A | 6/2000 | Ballard | | 709/229 |
| 6,081,900 A | 6/2000 | Subramaniam et al. | | 713/201 |
| 6,094,618 A | 7/2000 | Harada | | 701/207 |
| 6,101,480 A | 8/2000 | Conmy et al. | | 705/9 |
| 6,108,330 A | 8/2000 | Bhatia et al. | | 370/352 |
| 6,108,703 A | 8/2000 | Leighton et al. | | 709/226 |
| 6,112,024 A | 8/2000 | Almond et al. | | 395/703 |
| 6,115,797 A | 9/2000 | Kanda et al. | | 711/147 |
| 6,131,096 A | 10/2000 | Ng et al. | | 707/10 |
| 6,131,116 A | 10/2000 | Riggins et al. | | 709/219 |
| 6,141,011 A | 10/2000 | Bodnar et al. | | 345/357 |
| 6,141,621 A | 10/2000 | Piwowarski et al. | | 340/989 |
| 6,141,659 A | 10/2000 | Barker et al. | | 707/102 |
| 6,141,664 A | 10/2000 | Boothby | | 707/201 |
| 6,145,088 A | 11/2000 | Stevens | | 714/2 |
| 6,148,260 A | 11/2000 | Musk et al. | | 701/200 |
| 6,151,606 A | 11/2000 | Mendez | | 707/201 |
| 6,157,630 A | 12/2000 | Adler et al. | | 370/310 |
| 6,163,773 A | 12/2000 | Kishi | | 706/16 |
| 6,163,779 A | 12/2000 | Mantha et al. | | 707/100 |
| 6,163,844 A | 12/2000 | Duncan et al. | | 713/201 |
| 6,167,120 A | 12/2000 | Kikinis | | 379/90.01 |
| 6,173,310 B1 | 1/2001 | Yost et al. | | 709/201 |
| 6,173,311 B1 | 1/2001 | Hassett et al. | | 709/202 |
| 6,182,117 B1 | 1/2001 | Christie et al. | | 709/205 |
| 6,182,141 B1 | 1/2001 | Blum et al. | | 709/227 |

(56) References Cited

U.S. PATENT DOCUMENTS

| | | | | |
|---|---|---|---|---|
| 6,185,598 | B1 | 2/2001 | Farber et al. | 709/200 |
| 6,189,030 | B1 | 2/2001 | Kirsch et al. | 709/224 |
| 6,189,096 | B1 | 2/2001 | Haverty | 713/155 |
| 6,195,695 | B1 | 2/2001 | Cheston et al. | 709/221 |
| 6,195,794 | B1 | 2/2001 | Buxton | 717/11 |
| 6,202,085 | B1 | 3/2001 | Benson et al. | 709/205 |
| 6,205,448 | B1 | 3/2001 | Kruglikov et al. | 707/200 |
| 6,209,034 | B1 | 3/2001 | Gladwin et al. | 709/227 |
| 6,212,529 | B1 | 4/2001 | Boothby et al. | 707/201 |
| 6,212,556 | B1 | 4/2001 | Arunachalam | 709/219 |
| 6,216,131 | B1 | 4/2001 | Liu et al. | 707/102 |
| 6,219,680 | B1 | 4/2001 | Bernardo et al. | 707/501 |
| 6,219,694 | B1 | 4/2001 | Lazaridis et al. | 709/206 |
| 6,223,187 | B1 | 4/2001 | Boothby et al. | 707/201 |
| 6,226,650 | B1 | 5/2001 | Mahajan et al. | 707/201 |
| 6,233,565 | B1 | 5/2001 | Lewis et al. | 705/35 |
| 6,233,589 | B1 | 5/2001 | Balcha et al. | 707/203 |
| 6,243,705 | B1 * | 6/2001 | Kucala | 1/1 |
| 6,243,760 | B1 | 6/2001 | Armbruster et al. | 709/243 |
| 6,246,889 | B1 | 6/2001 | Boltz | |
| 6,247,048 | B1 | 6/2001 | Greer et al. | 709/219 |
| 6,247,135 | B1 | 6/2001 | Feague | 713/400 |
| 6,249,690 | B1 | 6/2001 | Mashiko | 455/573 |
| 6,252,547 | B1 | 6/2001 | Perry et al. | 342/357.06 |
| 6,255,989 | B1 | 7/2001 | Munson et al. | 342/357.13 |
| 6,256,750 | B1 | 7/2001 | Takeda | 714/11 |
| 6,260,124 | B1 | 7/2001 | Crockett et al. | 711/162 |
| 6,269,405 | B1 * | 7/2001 | Dutcher et al. | 709/248 |
| 6,272,545 | B1 | 8/2001 | Flanagin et al. | 709/228 |
| 6,275,831 | B1 | 8/2001 | Bodnar et al. | 707/201 |
| 6,278,941 | B1 | 8/2001 | Yokoyama | 701/209 |
| 6,282,435 | B1 | 8/2001 | Wagner et al. | 455/566 |
| 6,282,698 | B1 | 8/2001 | Baker et al. | 717/1 |
| 6,285,889 | B1 | 9/2001 | Nykanen et al. | 455/557 |
| 6,286,029 | B1 | 9/2001 | Delph | 709/203 |
| 6,286,053 | B1 | 9/2001 | Van Peursem et al. | 709/999.999 |
| 6,286,085 | B1 | 9/2001 | Jouenne et al. | 711/162 |
| 6,289,212 | B1 | 9/2001 | Stein et al. | |
| 6,292,743 | B1 | 9/2001 | Pu et al. | 455/456 |
| 6,292,905 | B1 | 9/2001 | Wallach et al. | 714/4 |
| 6,295,502 | B1 | 9/2001 | Hancock et al. | 701/201 |
| 6,295,541 | B1 * | 9/2001 | Bodnar et al. | 1/1 |
| 6,304,881 | B1 | 10/2001 | Halim et al. | 707/201 |
| 6,317,755 | B1 | 11/2001 | Rakers et al. | 707/204 |
| 6,321,236 | B1 | 11/2001 | Zollinger et al. | 707/201 |
| 6,324,467 | B1 | 11/2001 | Machii et al. | 701/200 |
| 6,324,526 | B1 | 11/2001 | D'Agostino | 705/44 |
| 6,324,544 | B1 | 11/2001 | Alam et al. | 707/201 |
| 6,327,533 | B1 | 12/2001 | Chou | 340/988 |
| 6,329,680 | B1 | 12/2001 | Yoshida et al. | 257/296 |
| 6,330,568 | B1 | 12/2001 | Boothby et al. | 707/201 |
| 6,332,158 | B1 | 12/2001 | Risley et al. | 709/219 |
| 6,333,973 | B1 | 12/2001 | Smith et al. | 379/88.12 |
| 6,338,096 | B1 | 1/2002 | Ukelson | 719/319 |
| 6,339,710 | B1 | 1/2002 | Suzuki | 455/458 |
| 6,341,316 | B1 | 1/2002 | Kloba et al. | 709/248 |
| 6,345,308 | B1 | 2/2002 | Abe | 709/248 |
| 6,349,336 | B1 | 2/2002 | Sit et al. | 709/227 |
| 6,353,448 | B1 | 3/2002 | Scarborough et al. | 345/349 |
| 6,356,910 | B1 | 3/2002 | Zellweger | 707/100 |
| 6,356,961 | B1 | 3/2002 | Oprescu-Surcobe | 710/20 |
| 6,360,250 | B1 * | 3/2002 | Anupam et al. | 709/204 |
| 6,360,330 | B1 | 3/2002 | Mutalik et al. | 714/4 |
| 6,363,249 | B1 | 3/2002 | Nordeman et al. | 455/418 |
| 6,363,412 | B1 | 3/2002 | Niwa et al. | 709/203 |
| 6,374,250 | B2 | 4/2002 | Ajtai et al. | 707/101 |
| 6,381,700 | B1 | 4/2002 | Yoshida | 713/201 |
| 6,389,462 | B1 | 5/2002 | Cohen et al. | 709/218 |
| 6,396,482 | B1 | 5/2002 | Griffin et al. | 345/169 |
| 6,397,307 | B2 | 5/2002 | Ohran | 711/161 |
| 6,397,351 | B1 | 5/2002 | Miller et al. | 714/13 |
| 6,401,104 | B1 | 6/2002 | LaRue et al. | 707/203 |
| 6,405,218 | B1 | 6/2002 | Boothby | 707/201 |
| 6,418,309 | B1 | 7/2002 | Moon et al. | 455/418 |
| 6,430,289 | B1 | 8/2002 | Liffick | |
| 6,430,576 | B1 * | 8/2002 | Gates et al. | 1/1 |
| 6,434,621 | B1 | 8/2002 | Pezzillo et al. | 709/1 |
| 6,434,627 | B1 | 8/2002 | Millet et al. | 709/245 |
| 6,437,818 | B1 | 8/2002 | Ludwig et al. | 348/14.09 |
| 6,449,622 | B1 | 9/2002 | LaRue et al. | 707/201 |
| 6,453,392 | B1 | 9/2002 | Flynn, Jr. | 711/151 |
| 6,457,062 | B1 | 9/2002 | Pivowar et al. | 709/248 |
| 6,460,036 | B1 | 10/2002 | Herz | 707/10 |
| 6,462,644 | B1 | 10/2002 | Howell et al. | 340/5.92 |
| 6,463,464 | B1 | 10/2002 | Lazaridis et al. | 709/207 |
| 6,466,967 | B2 | 10/2002 | Landsman et al. | 709/203 |
| 6,473,621 | B1 | 10/2002 | Heie | 455/466 |
| 6,480,896 | B1 | 11/2002 | Brown et al. | 709/231 |
| 6,484,143 | B1 | 11/2002 | Swildens et al. | 705/1 |
| 6,487,560 | B1 | 11/2002 | LaRue et al. | 707/203 |
| 6,490,655 | B1 | 12/2002 | Kershaw | 711/151 |
| 6,496,944 | B1 | 12/2002 | Hsiao et al. | 714/15 |
| 6,499,108 | B1 | 12/2002 | Johnson | 713/201 |
| 6,505,216 | B1 | 1/2003 | Schutzman et al. | |
| 6,507,891 | B1 | 1/2003 | Challenger et al. | 711/122 |
| 6,516,314 | B1 | 2/2003 | Birkler et al. | |
| 6,516,327 | B1 | 2/2003 | Zondervan et al. | 707/200 |
| 6,519,452 | B1 | 2/2003 | Agostino et al. | 455/423 |
| 6,523,063 | B1 | 2/2003 | Hanson | 709/206 |
| 6,523,079 | B2 | 2/2003 | Kikinis et al. | 710/303 |
| 6,532,588 | B1 | 3/2003 | Porter | 717/170 |
| 6,535,743 | B1 | 3/2003 | Kennedy et al. | 455/456.1 |
| 6,535,949 | B1 | 3/2003 | Parker | |
| 6,539,494 | B1 | 3/2003 | Abramson et al. | 714/4 |
| 6,542,933 | B1 | 4/2003 | Durst, Jr. et al. | 709/229 |
| 6,546,425 | B1 | 4/2003 | Hanson et al. | 709/227 |
| 6,549,933 | B1 | 4/2003 | Barrett et al. | 709/203 |
| 6,549,937 | B1 | 4/2003 | Auerbach et al. | |
| 6,553,375 | B1 | 4/2003 | Huang et al. | 707/10 |
| 6,553,410 | B2 | 4/2003 | Kikinis | 709/218 |
| 6,553,413 | B1 | 4/2003 | Leighton et al. | 709/219 |
| 6,560,595 | B1 * | 5/2003 | Sanders et al. | 1/1 |
| 6,564,336 | B1 | 5/2003 | Majkowski | |
| 6,567,850 | B1 | 5/2003 | Freishtat et al. | 709/224 |
| 6,567,857 | B1 | 5/2003 | Gupta et al. | 709/238 |
| 6,581,065 | B1 | 6/2003 | Rodkin et al. | 707/102 |
| 6,584,454 | B1 | 6/2003 | Hummel et al. | 705/59 |
| 6,589,290 | B1 | 7/2003 | Maxwell et al. | 707/507 |
| 6,591,266 | B1 | 7/2003 | Li et al. | 707/10 |
| 6,591,306 | B1 | 7/2003 | Redlich | 709/245 |
| 6,591,362 | B1 | 7/2003 | Li | 713/1 |
| 6,597,700 | B2 | 7/2003 | Golikeri et al. | 370/401 |
| 6,601,071 | B1 * | 7/2003 | Bowker et al. | 715/234 |
| 6,601,143 | B1 | 7/2003 | Lamparter | 711/134 |
| 6,609,005 | B1 | 8/2003 | Chern | 455/457 |
| 6,628,194 | B1 | 9/2003 | Hellebust et al. | 340/7.51 |
| 6,636,894 | B1 | 10/2003 | Short et al. | 709/225 |
| 6,640,302 | B1 | 10/2003 | Subramaniam et al. | 713/169 |
| 6,643,707 | B1 | 11/2003 | Booth | 709/245 |
| 6,647,399 | B2 | 11/2003 | Zaremba | 707/204 |
| 6,654,746 | B1 | 11/2003 | Wong et al. | 707/10 |
| 6,662,212 | B1 | 12/2003 | Chandhok et al. | |
| 6,665,721 | B1 | 12/2003 | Hind et al. | 709/227 |
| 6,668,254 | B2 * | 12/2003 | Matson et al. | 1/1 |
| 6,671,724 | B1 | 12/2003 | Pandya et al. | 709/226 |
| 6,684,088 | B1 | 1/2004 | Halahmi | |
| 6,684,206 | B2 | 1/2004 | Chen et al. | 706/61 |
| 6,684,302 | B2 | 1/2004 | Kershaw | 711/151 |
| 6,694,335 | B1 | 2/2004 | Hopmann et al. | 707/200 |
| 6,701,316 | B1 | 3/2004 | Li et al. | 707/10 |
| 6,704,849 | B2 | 3/2004 | Steegmans | 711/162 |
| 6,714,987 | B1 | 3/2004 | Amin et al. | 709/249 |
| 6,718,336 | B1 * | 4/2004 | Saffer et al. | 1/1 |
| 6,718,348 | B1 | 4/2004 | Novak et al. | 707/201 |
| 6,718,390 | B1 | 4/2004 | Still et al. | 709/229 |
| 6,725,239 | B2 | 4/2004 | Sherman et al. | 707/201 |
| 6,728,530 | B1 | 4/2004 | Heinonen et al. | 455/414.1 |
| 6,732,101 | B1 | 5/2004 | Cook | 707/10 |
| 6,732,264 | B1 | 5/2004 | Sun et al. | 713/2 |
| 6,741,851 | B1 | 5/2004 | Lee et al. | 455/410 |
| 6,745,040 | B2 | 6/2004 | Zimmerman | 455/458 |
| 6,757,698 | B2 | 6/2004 | McBride et al. | 707/204 |
| 6,757,712 | B1 | 6/2004 | Bastian et al. | 709/206 |
| 6,781,575 | B1 | 8/2004 | Hawkins et al. | 345/173 |

(56) References Cited

U.S. PATENT DOCUMENTS

| | | | |
|---|---|---|---|
| 6,795,848 B1 | 9/2004 | Border et al. ............... 709/213 |
| 6,799,214 B1 | 9/2004 | Li ............................... 709/226 |
| 6,804,690 B1 | 10/2004 | Dysert et al. ................. 707/204 |
| 6,804,783 B1 | 10/2004 | Wesinger, Jr. et al. ........ 713/200 |
| 6,810,411 B1 | 10/2004 | Coughlin et al. ............. 709/203 |
| 6,812,961 B1 | 11/2004 | Parulski et al. ............ 348/231.2 |
| 6,813,487 B1 | 11/2004 | Trommelen ............... 455/404.1 |
| 6,816,481 B1 | 11/2004 | Adams et al. ................. 370/352 |
| 6,829,654 B1 | 12/2004 | Jungck ......................... 709/246 |
| 6,836,657 B2 | 12/2004 | Ji et al. ......................... 455/419 |
| 6,836,765 B1 | 12/2004 | Sussman ......................... 705/41 |
| 6,839,022 B1 | 1/2005 | Benco et al. ............... 342/357.1 |
| 6,839,568 B2 | 1/2005 | Suzuki ........................ 455/550.1 |
| 6,850,944 B1 | 2/2005 | MacCall et al. .............. 707/100 |
| 6,868,451 B1 | 3/2005 | Peacock ........................ 709/231 |
| 6,870,921 B1 | 3/2005 | Elsey et al. ............... 379/218.01 |
| 6,886,013 B1 | 4/2005 | Beranek ......................... 707/10 |
| 6,892,245 B1 | 5/2005 | Crump et al. ................ 709/245 |
| 6,904,449 B1 | 6/2005 | Quinones ...................... 709/203 |
| 6,904,460 B1 | 6/2005 | Raciborski et al. ........... 709/224 |
| 6,920,488 B1 | 7/2005 | Le Pennec et al. ........... 709/219 |
| 6,925,477 B1 | 8/2005 | Champagne et al. ......... 707/203 |
| 6,944,676 B1 | 9/2005 | Armbruster et al. .......... 709/243 |
| 6,954,660 B2 | 10/2005 | Aoyama ........................ 455/572 |
| 6,954,783 B1 | 10/2005 | Bodwell et al. ............... 709/218 |
| 6,959,331 B1 | 10/2005 | Traversat et al. ............. 709/222 |
| 6,963,914 B1 | 11/2005 | Breitbart et al. .............. 709/226 |
| 6,973,299 B2 | 12/2005 | Apfel ......................... 455/412.2 |
| 6,996,617 B1 | 2/2006 | Aiken, Jr. et al. ............. 709/227 |
| 6,996,631 B1 | 2/2006 | Aiken, Jr. et al. ............. 709/242 |
| 7,003,555 B1 | 2/2006 | Jungck ........................ 709/219 |
| 7,010,578 B1 | 3/2006 | Lewin et al. .................. 709/217 |
| 7,016,964 B1 | 3/2006 | Still et al. ..................... 709/229 |
| 7,023,868 B2 | 4/2006 | Rabenko et al. .............. 370/419 |
| 7,024,491 B1 | 4/2006 | Hanmann et al. |
| 7,030,730 B1 | 4/2006 | Zondervan ................... 340/7.29 |
| 7,039,656 B1 | 5/2006 | Tsai et al. ..................... 707/201 |
| 7,051,275 B2 | 5/2006 | Gupta et al. ................... 715/512 |
| 7,054,594 B2 | 5/2006 | Bloch et al. .................. 455/41.2 |
| 7,054,952 B1 | 5/2006 | Schwerdtfeger et al. ..... 709/246 |
| 7,082,476 B1 | 7/2006 | Cohen et al. ................. 709/246 |
| 7,085,817 B1 | 8/2006 | Tock et al. .................... 709/217 |
| 7,096,418 B1 | 8/2006 | Singhal et al. .............. 715/501.1 |
| 7,099,915 B1 | 8/2006 | Tenereillo et al. ............ 709/203 |
| 7,103,794 B2 | 9/2006 | Malcolm et al. ................. 714/4 |
| 7,107,043 B2 | 9/2006 | Aoyama .................... 455/412.1 |
| 7,110,954 B2 | 9/2006 | Yung et al. ....................... 705/1 |
| 7,116,681 B1 | 10/2006 | Hovell et al. .................. 370/466 |
| 7,146,161 B2 | 12/2006 | Chou ............................. 455/418 |
| 7,158,805 B1 | 1/2007 | Park et al. |
| 7,159,036 B2 | 1/2007 | Hinchliffe et al. |
| 7,162,494 B2 | 1/2007 | Arellano .................... 707/104.1 |
| 7,167,728 B1 | 1/2007 | Wagner et al. ................ 455/566 |
| 7,181,628 B2 | 2/2007 | Sato et al. ..................... 713/189 |
| 7,197,574 B1 | 3/2007 | Ishiyama ...................... 709/245 |
| 7,233,791 B2 | 6/2007 | Gilbert et al. ................. 455/419 |
| 7,237,027 B1 | 6/2007 | Raccah et al. ................ 709/226 |
| 7,249,175 B1 | 7/2007 | Donaldson ................... 709/225 |
| 7,269,433 B2 | 9/2007 | Vargas et al. ................. 455/502 |
| 7,284,051 B1 | 10/2007 | Okano et al. .................. 709/226 |
| 7,289,964 B1 | 10/2007 | Bowman-Amuah ............. 705/1 |
| 7,308,651 B2* | 12/2007 | Kling et al. ................... 715/709 |
| 7,315,826 B1 | 1/2008 | Guheen et al. ................... 705/7 |
| 7,317,907 B2 | 1/2008 | Linkert et al. ............. 455/412.1 |
| 7,328,341 B1 | 2/2008 | Eun et al. |
| 7,337,229 B2 | 2/2008 | Dutta et al. |
| 7,343,568 B2 | 3/2008 | Jiang et al. .................... 715/854 |
| 7,349,719 B2 | 3/2008 | Buniatyan .................... 455/557 |
| 7,356,559 B1 | 4/2008 | Jacobs et al. ................. 709/203 |
| 7,363,233 B1 | 4/2008 | Levine ............................. 705/1 |
| 7,383,061 B1 | 6/2008 | Hawkins ..................... 455/556.2 |
| 7,392,034 B2 | 6/2008 | Westman et al. .............. 455/402 |
| 7,440,746 B1 | 10/2008 | Swan ......................... 455/412.1 |
| 7,447,743 B1 | 11/2008 | Jordan, Jr. ..................... 709/206 |
| 7,454,500 B1 | 11/2008 | Hsu et al. ...................... 709/226 |
| 7,519,702 B1 | 4/2009 | Allan ............................ 709/224 |
| 7,539,697 B1 | 5/2009 | Akella et al. |
| 7,587,398 B1 | 9/2009 | Fredricksen et al. |
| 7,596,609 B1 | 9/2009 | Refuah et al. ................. 709/218 |
| 7,663,652 B1 | 2/2010 | Reese ............................ 345/744 |
| 7,707,150 B2 | 4/2010 | Sundararajan et al. |
| 7,853,664 B1 | 12/2010 | Wang et al. |
| 8,010,095 B2 | 8/2011 | Natsuno et al. |
| 8,073,954 B1 | 12/2011 | Tu et al. |
| 8,224,308 B1 | 7/2012 | Gavrylyako et al. |
| 2001/0005849 A1* | 6/2001 | Boothby et al. .................. 707/1 |
| 2001/0014893 A1 | 8/2001 | Boothby ....................... 707/201 |
| 2001/0028363 A1 | 10/2001 | Nomoto et al. ............... 345/748 |
| 2001/0034737 A1 | 10/2001 | Cane et al. |
| 2001/0044805 A1 | 11/2001 | Multer et al. ................. 707/201 |
| 2001/0047393 A1 | 11/2001 | Arner et al. ................... 709/216 |
| 2001/0047471 A1 | 11/2001 | Johnson .......................... 713/1 |
| 2001/0051920 A1 | 12/2001 | Joao et al. ....................... 705/41 |
| 2001/0056473 A1 | 12/2001 | Arneson et al. |
| 2002/0007303 A1 | 1/2002 | Brookler et al. ................. 705/10 |
| 2002/0010868 A1 | 1/2002 | Nakashima et al. .......... 713/201 |
| 2002/0016818 A1 | 2/2002 | Kirani et al. .................. 709/206 |
| 2002/0016912 A1 | 2/2002 | Johnson ........................ 713/165 |
| 2002/0023136 A1 | 2/2002 | Silver et al. |
| 2002/0032751 A1 | 3/2002 | Bharadwaj .................... 709/218 |
| 2002/0035605 A1 | 3/2002 | McDowell et al. |
| 2002/0049852 A1 | 4/2002 | Lee et al. ...................... 709/231 |
| 2002/0055909 A1 | 5/2002 | Fung et al. ...................... 705/42 |
| 2002/0056011 A1 | 5/2002 | Nardone et al. .............. 709/248 |
| 2002/0059116 A1 | 5/2002 | Bulatovic et al. .............. 705/27 |
| 2002/0062365 A1 | 5/2002 | Nishikawa et al. ........... 709/223 |
| 2002/0067816 A1 | 6/2002 | Bushnell .................... 379/201.02 |
| 2002/0069178 A1 | 6/2002 | Hoffman |
| 2002/0072350 A1 | 6/2002 | Fukuzato |
| 2002/0073212 A1 | 6/2002 | Sokol et al. ................... 709/229 |
| 2002/0078075 A1 | 6/2002 | Colson et al. ................. 707/204 |
| 2002/0082995 A1 | 6/2002 | Christie ........................... 705/44 |
| 2002/0083325 A1 | 6/2002 | Mediratta et al. ............. 713/191 |
| 2002/0087588 A1 | 7/2002 | McBride et al. |
| 2002/0091785 A1 | 7/2002 | Ohlenbusch et al. ......... 709/208 |
| 2002/0116444 A1 | 8/2002 | Chaudhri et al. ............. 709/201 |
| 2002/0118192 A1* | 8/2002 | Couckuyt et al. ............. 345/440 |
| 2002/0120600 A1 | 8/2002 | Schiavone et al. ................ 707/1 |
| 2002/0126814 A1 | 9/2002 | Awada et al. |
| 2002/0128908 A1 | 9/2002 | Levin et al. ..................... 705/14 |
| 2002/0129047 A1 | 9/2002 | Cane et al. |
| 2002/0138582 A1 | 9/2002 | Chandra et al. ............... 709/206 |
| 2002/0138765 A1 | 9/2002 | Fishman et al. .............. 713/201 |
| 2002/0152278 A1 | 10/2002 | Pontenzone et al. .......... 709/217 |
| 2002/0162011 A1 | 10/2002 | Tanaka et al. ................. 713/200 |
| 2002/0168964 A1 | 11/2002 | Kraft ............................. 455/412 |
| 2002/0168975 A1 | 11/2002 | Gresham et al. |
| 2002/0194193 A1 | 12/2002 | Fenton et al. |
| 2002/0194196 A1* | 12/2002 | Weinberg et al. .......... 707/104.1 |
| 2003/0021274 A1 | 1/2003 | Siikaniemi et al. ........... 370/392 |
| 2003/0028451 A1 | 2/2003 | Ananian ......................... 705/27 |
| 2003/0028554 A1 | 2/2003 | Koskimies et al. ............ 707/201 |
| 2003/0028603 A1 | 2/2003 | Aktas et al. |
| 2003/0028647 A1 | 2/2003 | Grosu |
| 2003/0037020 A1 | 2/2003 | Novak et al. ...................... 707/1 |
| 2003/0043195 A1* | 3/2003 | Kling et al. .................... 345/766 |
| 2003/0046433 A1 | 3/2003 | Luzzatti et al. |
| 2003/0061163 A1 | 3/2003 | Durfield ......................... 705/44 |
| 2003/0065934 A1 | 4/2003 | Angelo et al. ................ 713/200 |
| 2003/0069874 A1 | 4/2003 | Hertzog et al. ................... 707/1 |
| 2003/0084121 A1 | 5/2003 | De Boor et al. ............... 709/218 |
| 2003/0093797 A1 | 5/2003 | Bazzaz |
| 2003/0110280 A1 | 6/2003 | Hinchliffe et al. |
| 2003/0115240 A1 | 6/2003 | Cho |
| 2003/0134625 A1 | 7/2003 | Choi ............................. 455/418 |
| 2003/0135463 A1 | 7/2003 | Brown et al. ................... 705/44 |
| 2003/0139172 A1 | 7/2003 | Lampela et al. .............. 455/415 |
| 2003/0158960 A1 | 8/2003 | Engberg |
| 2003/0163483 A1 | 8/2003 | Zingher et al. |
| 2003/0172236 A1 | 9/2003 | Iyengar et al. |
| 2003/0200023 A1 | 10/2003 | Matsushita et al. |
| 2003/0204568 A1 | 10/2003 | Bhargava et al. ............. 709/206 |
| 2003/0208546 A1 | 11/2003 | Desalvo et al. ............... 709/206 |
| 2003/0217181 A1* | 11/2003 | Kiiskinen ...................... 709/248 |

(56) References Cited

U.S. PATENT DOCUMENTS

| | | |
|---|---|---|
| 2003/0224760 A1 | 12/2003 | Day ......................... 455/412.1 |
| 2003/0229723 A1 | 12/2003 | Kangas et al. |
| 2003/0229898 A1 | 12/2003 | Babu et al. ....................... 725/87 |
| 2003/0233383 A1 | 12/2003 | Koskimies ...................... 707/204 |
| 2003/0233418 A1 | 12/2003 | Goldman |
| 2003/0236933 A1 | 12/2003 | Shigeta et al. |
| 2004/0003390 A1 | 1/2004 | Canter et al. |
| 2004/0054746 A1 | 3/2004 | Shibata ........................ 709/207 |
| 2004/0058673 A1 | 3/2004 | Irlam et al. |
| 2004/0093317 A1 | 5/2004 | Swan ............................. 707/10 |
| 2004/0093342 A1* | 5/2004 | Arbo et al. ..................... 707/102 |
| 2004/0093385 A1 | 5/2004 | Yamagata ...................... 709/206 |
| 2004/0110497 A1 | 6/2004 | Little |
| 2004/0111465 A1 | 6/2004 | Chuang et al. ................. 709/203 |
| 2004/0120477 A1 | 6/2004 | Nguyen et al. ............. 379/88.19 |
| 2004/0128324 A1 | 7/2004 | Sheynman et al. |
| 2004/0132428 A1 | 7/2004 | Mulligan ....................... 455/411 |
| 2004/0142711 A1 | 7/2004 | Mahonen et al. ............. 455/502 |
| 2004/0146150 A1 | 7/2004 | Barnes |
| 2004/0148408 A1 | 7/2004 | Nadarajah ..................... 709/229 |
| 2004/0162830 A1 | 8/2004 | Shirwadkar et al. ............ 707/10 |
| 2004/0174965 A1 | 9/2004 | Brahm et al. |
| 2004/0192260 A1 | 9/2004 | Sugimoto et al. ........... 455/412.1 |
| 2004/0192282 A1 | 9/2004 | Vasudevan .................... 455/419 |
| 2004/0193953 A1 | 9/2004 | Callahan et al. ................ 714/15 |
| 2004/0204120 A1 | 10/2004 | Jiles ............................. 455/564 |
| 2004/0224665 A1 | 11/2004 | Kokubo ....................... 455/411 |
| 2004/0235523 A1 | 11/2004 | Schrire et al. ................ 455/558 |
| 2004/0243994 A1 | 12/2004 | Nasu |
| 2004/0267390 A1 | 12/2004 | Ben-Yaacov et al. |
| 2004/0267676 A1* | 12/2004 | Feng et al. ..................... 705/400 |
| 2004/0267944 A1 | 12/2004 | Britt .............................. 709/229 |
| 2005/0021571 A1 | 1/2005 | East ............................. 707/101 |
| 2005/0032527 A1 | 2/2005 | Sheha et al. ................. 455/456.1 |
| 2005/0044404 A1 | 2/2005 | Bhansali et al. |
| 2005/0050117 A1 | 3/2005 | Seo et al. |
| 2005/0054354 A1 | 3/2005 | Roman et al. |
| 2005/0060392 A1 | 3/2005 | Goring et al. ................. 709/220 |
| 2005/0064859 A1 | 3/2005 | Kotzin et al. ................. 455/419 |
| 2005/0081152 A1 | 4/2005 | Commarford |
| 2005/0086296 A1 | 4/2005 | Chi et al. ....................... 709/203 |
| 2005/0086318 A1 | 4/2005 | Aubault ........................ 709/213 |
| 2005/0090253 A1 | 4/2005 | Kim et al. ................... 455/435.1 |
| 2005/0096975 A1 | 5/2005 | Moshe |
| 2005/0099963 A1 | 5/2005 | Multer et al. .................... 707/10 |
| 2005/0100150 A1 | 5/2005 | Dhara et al. .................. 379/142.01 |
| 2005/0102328 A1 | 5/2005 | Ring et al. ..................... 707/204 |
| 2005/0102329 A1 | 5/2005 | Jiang et al. |
| 2005/0114470 A1 | 5/2005 | Bal |
| 2005/0131990 A1 | 6/2005 | Jewell ........................... 709/201 |
| 2005/0143111 A1 | 6/2005 | Fitzpatrick et al. |
| 2005/0144200 A1 | 6/2005 | Hesselink et al. |
| 2005/0144251 A1 | 6/2005 | Slate |
| 2005/0157858 A1 | 7/2005 | Rajagopalan |
| 2005/0191998 A1 | 9/2005 | Onyon et al. |
| 2005/0203971 A1 | 9/2005 | Koskimies et al. ........... 707/203 |
| 2005/0203992 A1 | 9/2005 | Tanaka et al. |
| 2005/0204001 A1 | 9/2005 | Stein et al. .................... 709/206 |
| 2005/0210101 A1 | 9/2005 | Janik ............................ 709/203 |
| 2005/0216300 A1 | 9/2005 | Appelman et al. |
| 2005/0227674 A1 | 10/2005 | Kopra et al. ................. 455/414.1 |
| 2005/0233800 A1 | 10/2005 | Jones |
| 2005/0240494 A1 | 10/2005 | Cue et al. ........................ 705/27 |
| 2005/0246325 A1 | 11/2005 | Pettinati et al. |
| 2005/0268107 A1 | 12/2005 | Harris et al. |
| 2005/0273632 A1 | 12/2005 | Kawakami .................... 713/193 |
| 2005/0283741 A1 | 12/2005 | Balabanovic et al. |
| 2006/0021059 A1 | 1/2006 | Brown et al. ................. 455/410 |
| 2006/0035647 A1 | 2/2006 | Eisner et al. ................ 455/456.1 |
| 2006/0095397 A1 | 5/2006 | Torres et al. |
| 2006/0129627 A1 | 6/2006 | Phillips et al. |
| 2006/0148418 A1 | 7/2006 | Purkayastha et al. |
| 2006/0148477 A1 | 7/2006 | Reilly |
| 2006/0190626 A1 | 8/2006 | Bhogal et al. ................. 709/248 |
| 2006/0195474 A1 | 8/2006 | Cadiz et al. |
| 2006/0199599 A1 | 9/2006 | Gupta et al. |
| 2006/0206709 A1 | 9/2006 | Labrou et al. |
| 2006/0212482 A1 | 9/2006 | Celik ........................ 707/104.1 |
| 2006/0233335 A1 | 10/2006 | Pfleging et al. |
| 2006/0268842 A1 | 11/2006 | Takahashi et al. |
| 2006/0277160 A1 | 12/2006 | Singh et al. |
| 2006/0288112 A1 | 12/2006 | Soelberg et al. |
| 2007/0005504 A1 | 1/2007 | Chen et al. |
| 2007/0016796 A1 | 1/2007 | Singhal |
| 2007/0019098 A1 | 1/2007 | Senba et al. |
| 2007/0022469 A1 | 1/2007 | Cooper et al. |
| 2007/0043739 A1 | 2/2007 | Takai et al. |
| 2007/0047533 A1 | 3/2007 | Criddle et al. |
| 2007/0050734 A1 | 3/2007 | Busey ............................ 715/853 |
| 2007/0061331 A1 | 3/2007 | Ramer et al. .................... 707/10 |
| 2007/0082668 A1 | 4/2007 | Silver et al. ................. 455/432.3 |
| 2007/0094042 A1 | 4/2007 | Ramer et al. .................... 705/1 |
| 2007/0127597 A1* | 6/2007 | Ammer et al. ................ 375/324 |
| 2007/0214149 A1 | 9/2007 | Bodin et al. |
| 2007/0214264 A1 | 9/2007 | Koister |
| 2007/0220419 A1 | 9/2007 | Stibel et al. |
| 2007/0226272 A1 | 9/2007 | Huang et al. ................... 707/201 |
| 2007/0226783 A1 | 9/2007 | Mimlitsch |
| 2008/0005080 A1 | 1/2008 | Xiques et al. |
| 2008/0005282 A1 | 1/2008 | Gaedcke |
| 2008/0009268 A1 | 1/2008 | Ramer et al. ................. 455/412.1 |
| 2008/0022220 A1 | 1/2008 | Cheah ........................... 715/769 |
| 2008/0027826 A1* | 1/2008 | Popick et al. .................... 705/26 |
| 2008/0039020 A1 | 2/2008 | Eskin ........................... 455/41.2 |
| 2008/0051071 A1 | 2/2008 | Vishwanathan et al. |
| 2008/0051117 A1 | 2/2008 | Khare et al. |
| 2008/0059897 A1 | 3/2008 | Dilorenzo |
| 2008/0064378 A1 | 3/2008 | Kahan et al. |
| 2008/0089297 A1 | 4/2008 | Lindsley et al. |
| 2008/0104442 A1 | 5/2008 | Diao et al. |
| 2008/0120199 A1 | 5/2008 | Pirnack et al. |
| 2008/0127289 A1 | 5/2008 | Julia et al. |
| 2008/0208617 A1 | 8/2008 | Onyon et al. |
| 2008/0214167 A1 | 9/2008 | Natsuno et al. |
| 2008/0268823 A1 | 10/2008 | Shalev et al. |
| 2008/0270805 A1 | 10/2008 | Kean |
| 2008/0294768 A1 | 11/2008 | Sampson et al. |
| 2009/0012940 A1 | 1/2009 | Ives et al. |
| 2009/0029685 A1 | 1/2009 | Willis |
| 2009/0037828 A1 | 2/2009 | Waite et al. |
| 2009/0049135 A1 | 2/2009 | O'Sullivan et al. |
| 2009/0138546 A1 | 5/2009 | Cruzada |
| 2009/0287921 A1 | 11/2009 | Zhu et al. |
| 2009/0307486 A1 | 12/2009 | Grajek et al. |
| 2009/0327305 A1 | 12/2009 | Roberts et al. |
| 2010/0057777 A1* | 3/2010 | Williamson ................ 707/104.1 |
| 2010/0100945 A1 | 4/2010 | Ozzie et al. |
| 2010/0205448 A1 | 8/2010 | Tarhan et al. |
| 2010/0241857 A1 | 9/2010 | Okude et al. |
| 2010/0251230 A1 | 9/2010 | O'Farrell et al. |
| 2011/0107203 A1* | 5/2011 | Nash et al. ..................... 715/243 |
| 2011/0269424 A1 | 11/2011 | Multer et al. |
| 2012/0151346 A1 | 6/2012 | McClements, IV |

FOREIGN PATENT DOCUMENTS

| | | | |
|---|---|---|---|
| CN | 1313697 | 2/2005 | ............. G06F 17/30 |
| CN | 2003-122958 | 7/2006 | ............. H04Q 7/38 |
| EP | 0801487 | 10/1997 | ............. H04L 29/06 |
| EP | 0836131 A2 | 4/1998 | ............. G06F 1/00 |
| EP | 0836301 A | 4/1998 | ............. H04L 12/58 |
| EP | 0924917 A2 | 6/1999 | ............. H04M 3/42 |
| EP | 0930593 A | 7/1999 | ............. G08B 5/22 |
| EP | 1024441 A2 | 2/2000 | ............. G06F 17/30 |
| EP | 0986225 A1 | 3/2000 | ............. G06F 17/30 |
| EP | 1139608 A2 | 10/2001 | ............. H04L 12/28 |
| EP | 1180890 A2 | 2/2002 | ............. G06F 12/00 |
| EP | 1263244 A2 | 12/2002 | ............. H04Q 3/00 |
| EP | 1804418 | 4/2007 | |
| EP | 2043012 A1 | 4/2009 | |
| FR | 1998-106683 | 4/1998 | ............. G06F 17/30 |
| GB | 2366050 A | 6/2001 | ............. G06F 11/34 |
| JP | 7303146 A | 11/1995 | ............. H04M 3/42 |
| JP | 10191453 | 7/1998 | ............. H04Q 7/38 |

(56) References Cited

FOREIGN PATENT DOCUMENTS

| | | | |
|---|---|---|---|
| JP | 11242620 | 9/1999 | ............ G06F 12/00 |
| JP | 11242677 | 9/1999 | ............ G06F 12/00 |
| JP | 2000232680 A | 8/2000 | ............ G06F 15/00 |
| JP | 2000316053 A | 11/2000 | ............ G11B 20/10 |
| JP | 2002142254 A | 5/2002 | ............ G08B 25/00 |
| JP | 2002185575 A | 6/2002 | ............ H04M 1/00 |
| JP | 2002247144 A | 8/2002 | ............ H04M 1/00 |
| JP | 2002314689 A | 10/2002 | ............ G05Q 10/00 |
| JP | 2003259011 A | 9/2003 | ............ H04M 1/00 |
| WO | WO 97/04391 | 2/1997 | ............ G06F 11/14 |
| WO | WO 97/39564 | 10/1997 | ............ H04L 12/58 |
| WO | WO 97/41520 | 11/1997 | ............ G06F 17/30 |
| WO | WO 98/03005 | 1/1998 | ............ H04M 3/42 |
| WO | WO 98/21648 | 5/1998 | ............. G06F 9/00 |
| WO | WO 98/29994 A | 7/1998 | ............ H04L 12/58 |
| WO | WO 98/54662 | 12/1998 | ............ G06F 17/30 |
| WO | WO 98/56159 A | 12/1998 | ............ H04M 7/00 |
| WO | WO 99/05813 | 2/1999 | ............. H04L 9/00 |
| WO | WO 99/36870 | 7/1999 | ............ G06F 17/30 |
| WO | WO 99/40514 | 8/1999 | ............. G06F 9/46 |
| WO | WO 99/45451 | 9/1999 | ............ G06F 17/30 |
| WO | WO 99/45484 | 9/1999 | ............ G06F 17/30 |
| WO | WO 99/46701 A | 9/1999 | ............ G06F 17/30 |
| WO | WO 99/50761 | 10/1999 | ............ G06F 17/30 |
| WO | WO 99/65256 | 12/1999 | ............. H04Q 7/00 |
| WO | WO 00/11832 | 3/2000 | |
| WO | WO 00/16222 | 3/2000 | ............ G06F 17/30 |
| WO | WO 00/29998 | 5/2000 | ............ G06F 17/60 |
| WO | WO 01/33874 A1 | 5/2001 | ............ H04Q 7/24 |
| WO | WO 01/71539 | 9/2001 | ............ G06F 17/00 |
| WO | WO 01/80535 A1 | 9/2001 | ............ H04M 1/64 |
| WO | WO 02/17140 A2 | 2/2002 | ............ G06F 17/30 |
| WO | 03056789 A1 | 7/2003 | |
| WO | WO 03/083716 A1 | 10/2003 | ............ G06F 17/30 |
| WO | WO 2005/112586 A2 | 12/2005 | |

OTHER PUBLICATIONS

European Office Action, Dec. 28, 2011, Application No. 11187370.9.
Reed, Benjamin C., et al.,"Authenticating Network-Attached Storage," IEEE, Jan.-Feb. 2000, pp. 49-57.
Gaskin J.E.:Messaging—Instant Enterprise—Once a Novelty item, IM is Becoming a More Serious Tool for Business Users, InternetWeek, No. 810, Apr. 24, 2000, p. 55.
BusinessWire, "FusionOne Partners with WhitePages.com to Deliver Automatic Synchronization for Online Subscriber,"press release, Oct. 11, 2000.
Pabla C."SyncML Intensive," downloaded from www-128.ibm.com/developerworks/wireless/library/we-syncml2, Apr. 1, 2002.
Malone, et al., Semi-Structured Messages are Surprisingly Useful for Computer-Supported Coordination, Proceedings of the Conference on Computer-Supported Cooperative Work, Austin, Texas, Dec. 3-5, 1986, pp. 1-26.
Patel et al.,"The Multimedia Fax-MIME Gateway," 8440 IEEE MultiMedia No. 4, Jan. 1994, 7 pgs.
Lamb et al.,"LAN-Based Office for the Enterprise, A Case Study," Advantis Company, White Plains, NY 10605, Jan. 1994 IEEE, pp. 440-447.
Starfish, "TrueSync Data Synchronization," Software, http://www.starfishsoftware.com/solutions/data/data.html, Jan. 2003.
Rou et al., "Online File Storage System," 2002 Student Conference on Research and Development Proceedings, Shah Alam, Malaysia, Nov. 7, 2002, IEEE, pp. 83-86.
Agarwal et al., "On the Scalability of Data Synchronization Protocols for PDAs and Mobile Devices," Jul. 2002, IEEE Network, pp. 22-28.
Steffan Hallsteinsen et al., Using the Mobile Phone as a Security Token for Unified Authentication, in Second International Conference on Systems and Networks Communication (2007).
Anonymous: "Download filter for MMS", Research Disclosure, Mason Publications, Hampshire, GB, vol. 457, No. 28, May 1, 2002, XP007130322, ISSN: 0374-4353.
Intellisync Email Accelerator, A detailed guide to functionality-Product functionality paper, Mar. 2004, pp. 1-18.
Lee et al, "Monitoring Data Archives for Grid Environments," Jul. 2002, 10 pgs.
Batista et al. "Mining Web Access Logs of an On-line Newspaper" Jul. 2002, 8 pgshttp://ectrl.itc.it/rpec/.
Finnigan, Anne, "The Safe Way to Shop Online," Sep. 1998, p. 162, Good Housekeeping, v. 227 No. 3.
Chase, Larry, "Taking Transactions Online," Oct. 1998, pp. 124-132, Target Marketing, v.21 No. 10.
Gong, Li, "Increasing Availability and Security of an Authentication Service," Jun. 1993, pp. 657-662, IEEE Journal on Selected Areas in Communications, v. 11 No. 5.
Demaio, Harry B., "My MIPS are Sealed," Sep./Oct. 1993, pp. 46-51, Chief Information Officer Journal, v. 5 issue 7.
Internet Mail Consortium: :vCard Overview, Oct. 13, 1998, 3 pages, Retrieved from the Internet: www.imc.org/pdi/vcardoverview.
Internet Mail Consortium: :vCard The Electronic Business Card, Jan. 1, 1997, 5 pages, Retrieved from the Internet: www.imc.org/pdi/vcardwhite.html.
Jennings, J. "SyncML DM: A SyncML Protocol for Device Management," slide presentation, downloaded from www.openalliance.org/tech/affiliates/syncml/syncmldm_28jan02_james_jennings.pdf, Jan. 28, 2002, 23 pgs.
Toroi, T. "The SyncML Road Ahead—Application Development and Device Management," slide presentation, downloaded from www.openalliance.org/tech/affiliates/syncml/syncmldm_30jan02_teemu_Toroi.pdf, Jan. 30, 2002.
Sheha, M.A.et al. "Specification and Drawings of U.U. U.S. Appl. No. 60/493,704," filed Aug. 8, 2003.
FusionOne "FusionOne Unveils Integrated Carrier Product Suite to Deliver Mobility Solutions to Individuals and the Enterprise," Press Release, Mar. 18, 2002, 3 pgs.
FusionOne "FusionOne Unveils Mighty Phone™ Wireless Service," Press Release,Nov. 18, 2002, 3 pgs.
Business Wire, "SyncML Announces 18 New Compliant Products, SyncML DM Engineering Event Held; 99 Devices No Certified SyncML Compliant," Press Release, Sep. 25, 2002.

* cited by examiner

SYSTEM FOR AND METHOD OF FIELD MAPPING

FIELD OF THE INVENTION

The invention relates to a system for and method of mapping fields of data. More specifically, the invention relates to mapping fields of data between disparate devices.

BACKGROUND OF THE INVENTION

When information is stored in any sort of structure such as a database, if the information is ever transferred to another structure, there are considerations that must be taken into account such that all of the information is retained and is still accessible. If the first structure and the second structure are exactly the same with the same field names, then there should not be any issues with copying since the data will be accessible as it was before. For example, a database stores contact information, and the database fields include business fax, emergency contacts and home phone. If a company upgrades to a new system that has a new database but the new database still has the same fields of business fax, emergency contacts and home phone, the transition should be very smooth since the data will be located in the same fields.

However, when the databases are not the same, specifically the fields are not exactly the same, a methodology must be used to ensure the data is not lost and is easily accessible. One methodology is referred to as fixed field mapping where fields are fixedly mapped from one structure to another structure. For example, if the content of the employee database as described above is moved to a new database that has the fields of fax, home phone and other, a fixed mapping could include mapping business fax to fax, home phone to home phone and emergency contacts to other. While this adequately solves the problem of ensuring all of the data is transferred, it may lead to data being placed in a location that a user does not like. Furthermore, fixed field mapping requires either prior knowledge of the fields in the second database or assumptions of what fields are in the second database. Prior knowledge of the fields requires additional time and effort to make the transfer of data, and assumptions have the potential of being highly inaccurate.

SUMMARY OF THE INVENTION

The present invention, roughly described, pertains to a system for and a method of mapping fields between devices. However, unlike fixed field mapping where the fields are automatically mapped from one location to another, the present invention allows user input to map the fields to the appropriate location.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

DETAILED DESCRIPTION OF THE PREFERRED EMBODIMENT

A system for and method of mapping fields by incorporating user input provides an improved way of mapping fields between two or more devices.

When copying contact records from a first device to a second device, there needs to be a way of properly copying the data so that the data is located where the user expects it to be, since the second device may not store data in the contact records the same way the first device does. Field mapping utilizing user input enables highly specific mapping which makes user input field mapping very useful for mapping disparate devices. Specifically, when the devices have different fields for storing data, user input field mapping can ensure the data is copied to the correct location. For example, if a user wants to copy the data stored in his old mobile device to a new mobile device wherein the new mobile device has different fields for storing the data, user input field mapping enables him to do so efficiently and accurately.

Figure 1:
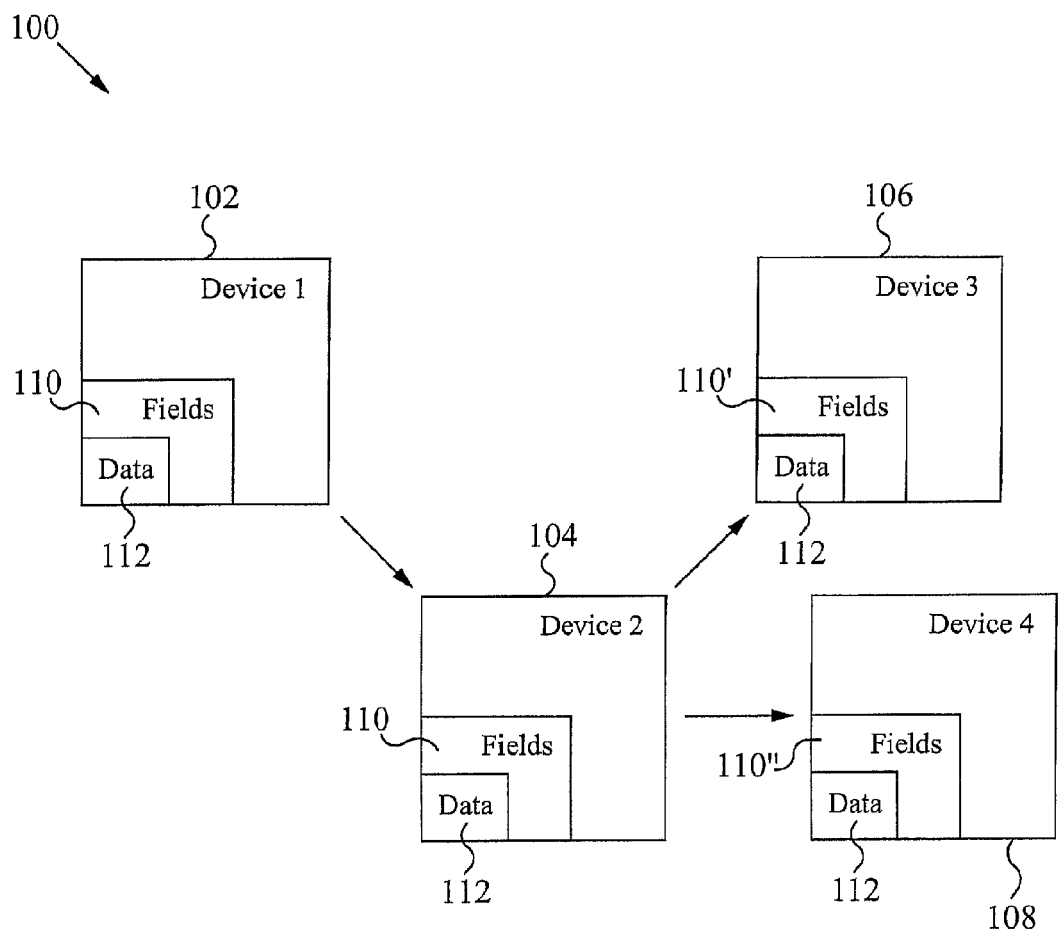
FIG. 1 illustrates a block diagram of a system implementing field mapping with user input.

FIG. 1 illustrates a block diagram of a system 100 implementing field mapping with user input. Initially, a first device 102 contains a first set of fields 110 which each store data 112. In some embodiments, the first set of fields 110 are contained in records in a database. For example, a user has 5 contacts—Bob, Cal, Christine, Josh and Sid. For each of the contacts, there are fields such as home phone, business fax and emergency contacts, which optionally contain data such as a phone number related to that contact. The first device 102 transfers the first set of fields 110 and the data 112 to a second device 104 which stores the first set of fields 110 and the data 112. Preferably, the transfer occurs utilizing the synchronization system as described in U.S. Pat. Nos. 6,671,757, 6,694,336 and 6,757,696, which are all incorporated by reference herein. In some embodiments, other methods are used to transfer the data. When desired, the data 112 is transferred to a third device 106. For example, the data is transferred when a user decides to purchase a new mobile device and wants his contact information transferred to the new phone. However, the third device 106 may contain a second set of fields 110' different from the first set of fields 110 on the first device 102. When transferring the data 112 from the second device 104 to the third device 106, the user is able to select where each field in the first set of fields 110 is mapped to in the second set of fields 110'. In some embodiments, a user is able to configure the mapping so that when a field in the first set of fields 110 is the same as a field in the second set of fields 110', the field is mapped automatically without user input.

As an example, the first set of fields 110 on the first device 102 includes a business fax field, an emergency contacts field and a home phone field, and the second set of fields 110' on the third device 106 includes a fax field, a home phone field and no emergency contact field at all. The matching home phone field is mapped automatically, and in some embodiments the data 112 in the home phone field is automatically transferred. Since there are no matches for the business fax field and the emergency contacts field, those fields are not automatically mapped. Instead, a user is prompted via a user interface to select which fields the business fax field and the emergency contacts field should be mapped to. For example, the user can select to map the business fax field to the fax field on the third device 106 and find some other field such as "other contacts" for the emergency contacts field to be mapped. By this implementation, the user ensures the data 112 goes to the appropriate field on the third device 106.

The user can also transfer the data 112 to another device such as a fourth device 108, for example, if the third device 106 is also replaced. Since the first set of fields 110 and the data 112 remain on the second device 104 even after being transferred to the third device 106, they can be mapped to the fourth device 108 similar to the third device 106. However, the second set of fields 110' can also be stored on the second device 104 and can be used to map to the fourth device 108. The user can select which mapping to use for the fourth device. Using the example above where the first set of fields 110 contains a business fax field, an emergency contacts field and a home phone field, when mapping to the fourth device 108, which has a third set of fields 110" including an emergency contacts field and a home phone field, those fields can be mapped directly. Then, with the business fax field, the user can again select a field from those available on the fourth device 108. If the user mapped business fax to fax on the third device 106 and then the fourth device 108 has both a fax and a business fax field, the user can select the desired field.

In accordance with the present invention, a device such as a first device 102, a third device 106 or a fourth device 108 includes a system memory which may further include an operating system having operating system (OS) service including telephony and linking services, networking services, multimedia and graphics display services all provided to a user interface. The OS may be the phone's proprietary OS, BREW, or any other device or operating system suitable for a phone (such as the Symbian Operating system). Additional base services and an operating system kernel may also be provided. The operating system may additionally provide an SMS client built into the operating system allowing short messages to be provided across a wireless communications line to other users.

In general, a hardware structure suitable for implementing any of the devices such as the server or webserver includes a processor, memory, nonvolatile storage device, portable storage device, network interface and I/O device(s). The choice of processor is not critical as long as a suitable processor with sufficient speed is chosen. Memory could be any conventional computer memory known in the art. Nonvolatile storage device could include a hard drive, CDROM, CDRW, flash memory card, or any other nonvolatile storage device. Portable storage could include a floppy disk drive or another portable storage device. The computing system may include one or more network interfaces. An example of a network interface includes a network card connected to an Ethernet or other type of LAN. I/O device(s) can include one or more of the following: keyboard, mouse, monitor, display, printer, modem and others. Software used to perform the methods of the present invention are likely to be stored in memory which include nonvolatile storage and volatile memory as well as, portable storage media.

Figure 2:
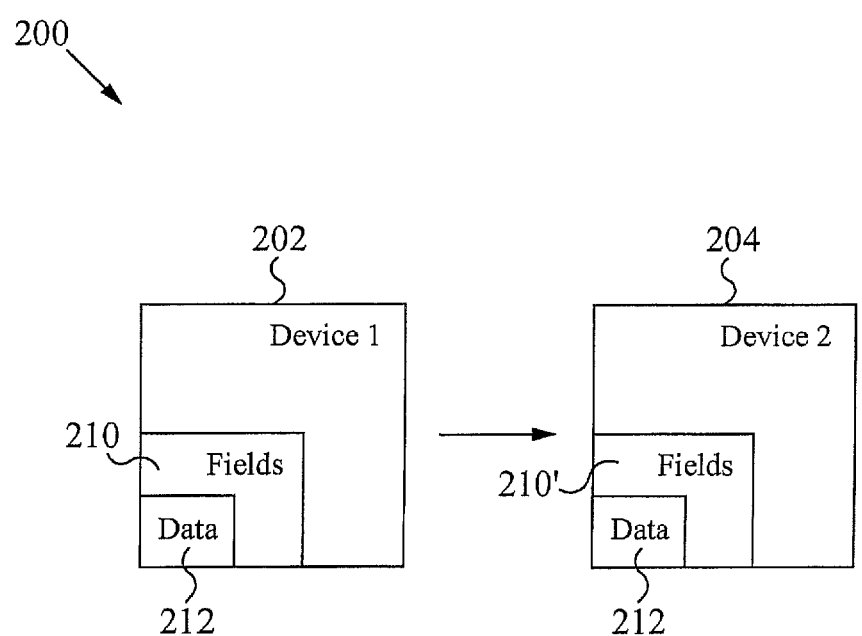
FIG. 2 illustrates a block diagram of a system field mapping between two devices.

FIG. 2 illustrates a block diagram of a system 200 field mapping between two devices. Similar to as described above, but without an intermediate device, a first device 202 maps a first set of fields 210 containing data 212 to a second device 204 with a second set of fields 210'. As described above, the fields which are matches are able to be mapped automatically, but for those that do not have matches, the user selects which fields are mapped.

Figure 3:
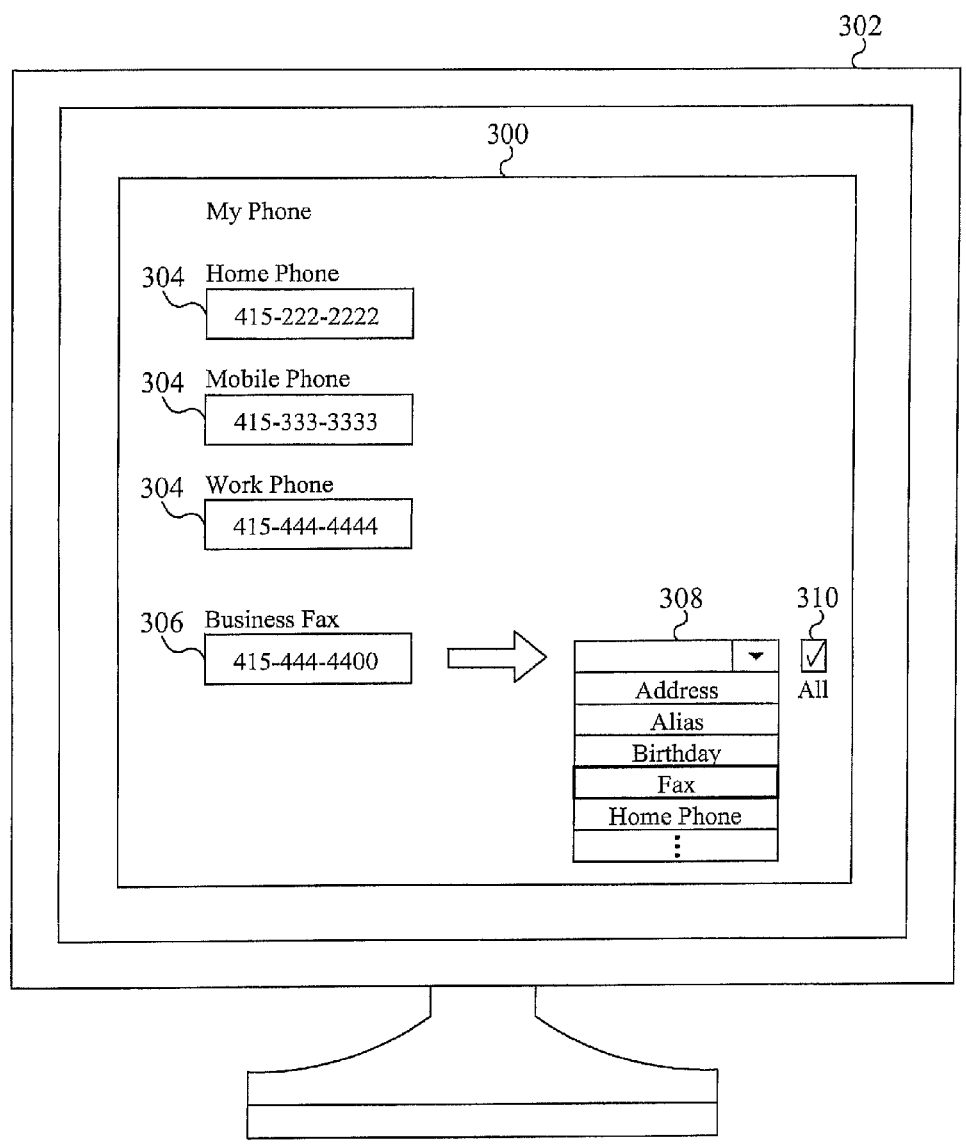
FIG. 3 illustrates a graphical representation of an exemplary user interface.

FIG. 3 illustrates a graphical representation of an exemplary user interface 300 displayed on a device 302. Preferably, the user interface 300 is a web-user interface viewable via a web-browser. Preferably, the user interface 300 is stored on the device 302. Preferably, the device 302 is a web-enabled computer. In some embodiments, the user interface 300 is an application displayed on a mobile device such as a cellular phone. The user interface 300 displays recognized or matched fields 304 which include fields of a first device which are recognized by a second device such as home phone, mobile phone and work phone. The user interface 300 also displays text contained in each unrecognized or unmatched field 306 and/or the field name of the unmatched field 306 with a corresponding input mechanism 308 such as a drop-down menu, a plurality of lists such that a user is able to drag a line or drag an item from one list to another list, radio/command buttons with text and any other input mechanism. The drop-down menu contains a list of all of the fields available to that device. In some embodiments, the list of available fields is listed in alphabetical order. In some embodiments, the list of available fields is based on relatedness to the unmatched field, such that if the original field is "business fax," then a field such as "fax" would appear first in the drop-down menu. In some embodiments, a checkbox 310 or similar mechanism allows a user to select to apply a field mapping to all records containing the specified field. For example, if a user wants all business fax fields to be mapped to a fax field instead of tediously mapping each record's business fax field, the user only has to make the mapping for one record and then the mapping will be applied to each record with that field. In some embodiments, where matched fields are not automatically mapped, the matched fields have an "accept" button and a "change" button next to the matched fields so that the user can accept or change the mapped field. In some embodiments, a user can select that a mapping will apply to only one device and the mapping settings will not be retained for future mappings.

As an example, if a first device contains data in fields of home phone, mobile phone, work phone and business fax, and a second device where the data is going to be transferred to contains fields of home phone, mobile phone, work phone but not business fax, then home phone, mobile phone and work phone will be listed as recognized fields on the user interface. However, since business fax is not a recognized field on the second device, a drop-down menu is provided via the user interface for a user to select the appropriate field for business fax to be mapped to. In the present example, the user selects the drop-down menu item "Fax." Therefore, the data stored in the business fax field on the first device is transferred to the fax field of the second device.

Figure 4:
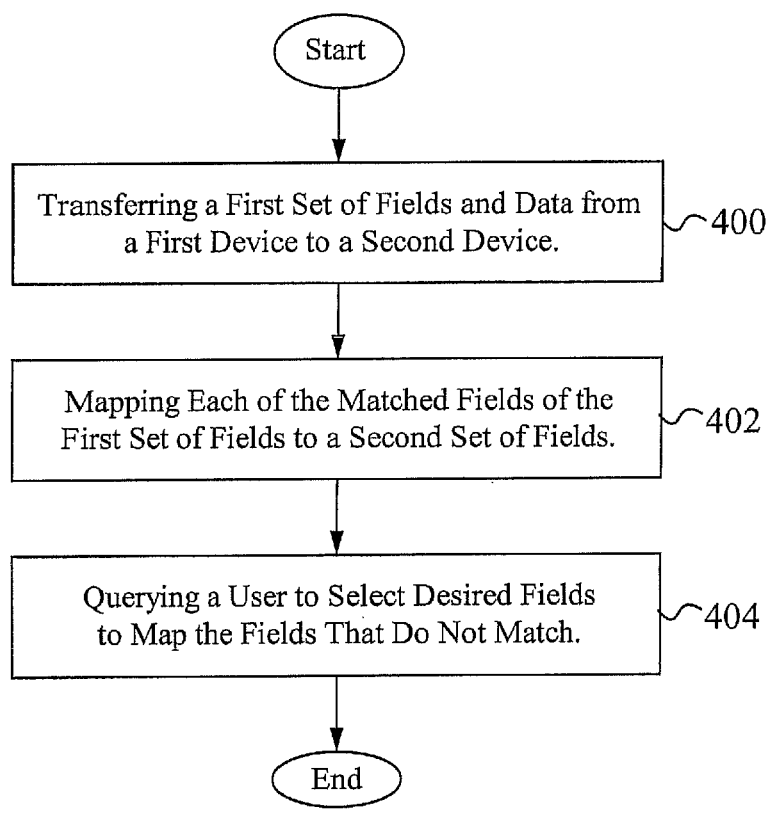
FIG. 4 illustrates a flowchart of a process of field mapping with user input.

FIG. 4 illustrates a flowchart of a process of field mapping with user input. In the step 400, the first set of fields 110 and data 112 are transferred from a first device 102 to a second device 104. Preferably, the transfer utilizes a synchronization system as described in U.S. Pat. Nos. 6,671,757, 6,694,336 and 6,757,696. In embodiments where there is no intermediate device, the step 400 is skipped. In the step 402, fields in the first set of fields 110 are automatically mapped to matching fields in the second set of fields 110', preferably on a third device. In embodiments where a field may match more than one field, the user is asked to select one of the matching fields. In the step 404, if there are fields in the first set of fields 110 that do not match fields in the second set of fields 110', then the user is asked to select desired field mappings. Preferably, the desired fields are selected using a drop-down menu. In embodiments with an "apply-to-all" input mechanism such as a checkbox, a user can select to apply this field mapping for all of the contacts. In some embodiments, after the fields are mapped, the data is transferred.

Figure 5:
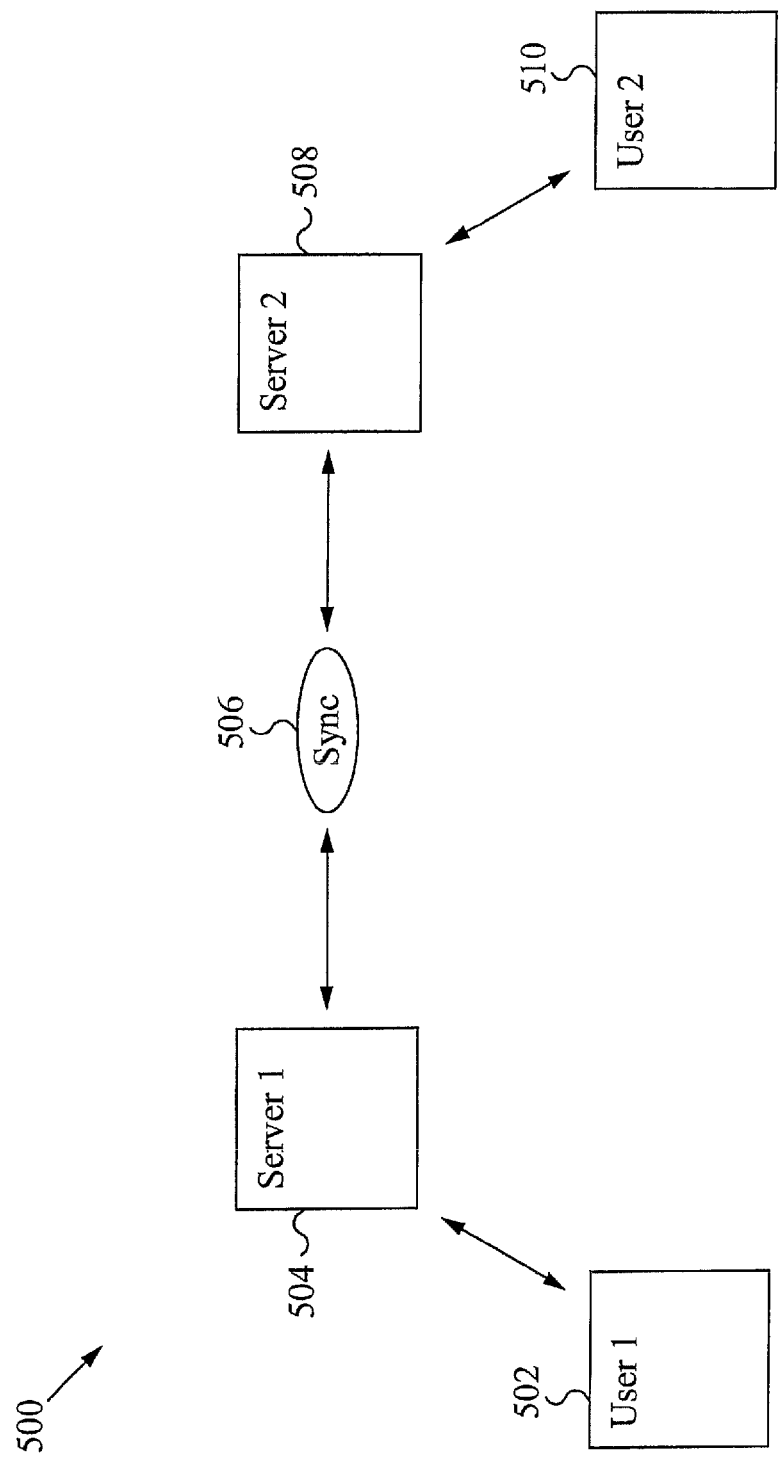
FIG. 5 illustrates a block diagram of a system field mapping between devices.

FIG. 5 illustrates a block diagram of a system 500 field mapping between devices. Similar to above, a first user device 502 contains a first set of fields which each store data. The first user device 502 transfers the first set of fields and the data to a first server device 504 which stores the first set of fields and the data. In some embodiments, the first server device 504 is a syncML server, an ActiveSync server or a server implementing another protocol. The transfer from the first user device 502 to the first server device 504 may include a mapping of the fields. The data is then transferred to a central sync device 506, which may also include another mapping of the fields. In some embodiments, the central sync device 506 implements the synchronization scheme as described in U.S. Pat. Nos. 6,671,757, 6,694,336 and 6,757,696, which are all incorporated by reference herein. From the central sync device 506, the data 522 is transferred to a second server device 508, which may include another mapping of the field. In some embodiments, the second server device 508 is a syncML server, an ActiveSync server or a server implementing another protocol. The data is then transferred to a second user device 510 using yet another mapping of the fields. For example, the data is transferred when a user decides to purchase a new mobile device and wants his contact information transferred to the new phone. However, the second user device 510 may contain a second set of fields different from the first set of fields on the first user device 502. When transferring the data from the first user device 502 to the second user device 510, the user is able to select where each field in the first set of fields is mapped to in the second set of fields. In some embodiments, a user is able to configure the mapping so that when a field in the first set of fields is the same as a field in the second set of fields, the field is mapped automatically without user input. The internal mapping that occurs in the first server device 504, the central sync device 506 and the second server device 508 is able to be performed with or without user knowledge and intervention.

To utilize field mapping via a user interface, the user interface is first initiated. The user is then able to determine how fields are mapped from one device to another device. Preferably, any fields that match between a first device and a second device are automatically mapped. For the fields that do not match, the user interface provides a list of available fields on the second device. The user then selects where to map the field from the list of available fields. In some embodiments, an intermediate device such as a server contains the fields and data to be mapped and transferred to the second device.

In operation, by field mapping utilizing a user interface instead of fixed field mapping, users have better control to more accurately map fields from one device to another. With automatic mapping for fields that match, that aspect of the process of mapping is sped up so that both efficiency and accuracy are provided.

Examples of suitable devices which utilize the present invention include a personal computer, computer workstation, mainframe computer, handheld computer, personal digital assistant, pager, cellular telephone, smart appliance or multiple computers, a storage area network, a server farm, or any other suitable computing device.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A network of devices comprising:
   a. a first user device containing an initial set of fields, the initial set of fields each containing data;
   b. a second user device containing a destination set of fields, wherein a portion of the destination set of fields does not match the initial set of fields, further wherein the first user device is configured for querying a user to select a field from the destination set of fields to map an unmatched field from the initial set of fields when transferring the data;
   c. a first server device for temporarily storing the data in a first transition set of fields during a transfer of the data received from the first user device;
   d. a synchronization device for synchronizing the data between the first user device and the second user device utilizing a second transition set of fields; and
   e. a second server device for temporarily storing the data in a third transition set of fields during a transfer of the data received from the synchronization device.

2. The network of devices of claim 1 wherein the first user device is a first mobile device and the second user device is a second mobile device.

3. The network of devices of claim 1 wherein the first user device and the second user device are selected from the group consisting of a personal computer, computer workstation, mainframe computer, handheld computer, personal digital assistant, pager, cellular telephone, smart appliance, a storage area network and a server farm.

4. The network of devices of claim 1 wherein the first user device implements a user interface for querying.

5. The network of devices of claim 4 wherein the user interface comprises a plurality of lists for the user to drag an item from a first list to a second list.

6. The network of devices of claim 4 wherein the user interface utilizes a drop-down menu to display the destination set of fields for the user to choose from.

7. The network of devices of claim 6 wherein the destination set of fields of the drop-down menu are ordered based on relatedness to the unmatched field of the initial set of fields.

8. A network of devices comprising:
   a. a first user device containing an initial set of fields, the initial set of fields each containing data;
   b. a second user device containing a destination set of fields, wherein a portion of the destination set of fields does not match the initial set of fields, further wherein the first user device is configured for querying a user to select a field from the destination set of fields to map an unmatched field from the initial set of fields when transferring the data;
   c. a first server device for temporarily storing the data in a first transition set of fields during a transfer of the data received from the first user device;
   d. a synchronization device for synchronizing the data between the first user device and the second user device utilizing a second transition set of fields; and
   e. a second server device for temporarily storing the data in a third transition set of fields during a transfer of the data received from the synchronization device, wherein the first user device, the second user device, the first server device, the synchronization device, and the second server device are stand alone devices.

9. The network of devices of claim 8 wherein the first user device is a first mobile device and the second user device is a second mobile device.

10. The network of devices of claim 8 wherein the first user device and the second user device are selected from the group consisting of a personal computer, computer workstation, mainframe computer, handheld computer, personal digital assistant, pager, cellular telephone, smart appliance, a storage area network and a server farm.

11. The network of devices of claim 8 wherein the first user device implements a user interface for querying.

12. The network of devices of claim 11 wherein the user interface comprises a plurality of lists for the user to drag an item from a first list to a second list.

13. The network of devices of claim 8 wherein the user interface utilizes a drop-down menu to display the destination set of fields for the user to choose from.

14. The network of devices of claim 13 wherein the destination set of fields of the drop-down menu are ordered based on relatedness to the unmatched field of the initial set of fields.

* * * * *